United States Patent [19]

Mehta

[11] Patent Number: 5,213,883
[45] Date of Patent: May 25, 1993

[54] DECOR SHEET CONTAINING FIBRETS

[75] Inventor: Mahendra Mehta, Pittsfield, Mass.

[73] Assignee: The Mead Corporation, Dayton, Ohio

[21] Appl. No.: 699,906

[22] Filed: May 14, 1991

[51] Int. Cl.$^5$ .......................... D02G 3/00; B32B 5/00
[52] U.S. Cl. ................................. 428/224; 428/244; 428/248; 428/288; 428/364; 428/400; 428/498; 428/526
[58] Field of Search ............... 428/400, 364, 224, 288, 428/290; 162/146; 493/42

[56] References Cited

U.S. PATENT DOCUMENTS 4,460,647 7/1984 Keith .................................. 428/400

Primary Examiner—Patrick J. Ryan
Assistant Examiner—Richard C. Weisberger
Attorney, Agent, or Firm—Thompson, Hine and Flory

[57] ABSTRACT

A decor sheet for use in a decorative laminate comprising:
bleached cellulose fibers;
about 10 to 60% titanium dioxide; and
about 1 to 20% cellulose acetate fibrets is described.

The decor sheet has a basis weight of 30 to 100 lbs./3000 sq. ft.

8 Claims, No Drawings

DECOR SHEET CONTAINING FIBRETS

BACKGROUND OF THE INVENTION

This invention relates generally to a decorative laminate having improved opacity, and more particularly, but not by way of limitation, to a decor sheet with high opacity at reduced basis weight and reduced ash.

High-pressure decorative laminates are laminated articles comprising plural layers of synthetic resin impregnated paper sheets consolidated or bonded together into a unitary structure under high heat and pressure. Conventionally, these laminates are made up of a plurality, e.g., seven or eight, of core or body sheets of a fibrous cellulose material, usually unbleached kraft paper, a decor sheet overlying the core sheets which cover the core sheets so that the brown paper of the core is not seen through the decor sheet, an optional but often used low basis weight overlay sheet, and an optional backing sheet. The decor sheet is usually made of high quality cellulose fiber impregnated with a thermosetting condensation resin such as a melamine formaldehyde resin.

These sheets are impregnated with resin and bonded together to form the decorative laminatae. Resins used may be any selected from phenolics, aminoplasts, polyesters, polyurethanes, epoxy resins and the like. Consolidation of the layers to a unitary laminated structure may involve pressures ranging from essentially zero (with contact only between the layers comprising the final laminate) to 2000 lbs. per sq. in. or more. Curing or setting of the resins may be accomplished at room temperature, or elevated temperatures (of the order of 150°–180° C.) to reduce the time required for curing.

For many applications it is necessary to maintain a level of opacity in the decor sheet to cover the core layers. This has been accomplished by adding opacifying pigments such as titanium dioxide to the paper furnish for the decor sheet to provide a controlled level of opacity. Titanium dioxide has been one of the most effective opacifiers for use in decorative laminates, however, titanium dioxide is expensive and it would be desirable if another filler or an agent of a different character could be used in conjunction with reduced amounts of titanium dioxide in forming decorative laminates without sacrificing the opacity of the decor sheet. Conventional fillers like clay, talc, silica, aluminum trihydrate (ATH), etc., have been employed in the decor sheets but are usually accompanied by a loss of opacity. One reason for this is that melamine formaldehyde has a refractive index very similar to fibers and fillers such as clay, talc, silica, and ATH. The overall refractive index becomes identical reducing potential fiber filler interfaces and thereby decreasing opacity.

There is therefore a need for a filler or extender which can be used in conjunction with titanium dioxide or other opacifying pigments in a decor sheet, without sacrificing a loss of opacity.

SUMMARY OF THE INVENTION

The present invention is directed to a decor sheet containing an opacifying pigment and an extender pigment known as "fibrets". Fibrets are highly fibrillated cellulose acetate available commercially from Hoechst-Celanese. Also useful are fibrets laden with titanium dioxide also available from Hoechst Celanese.

In a preferred embodiment of the present invention, the sheet contains an opacifying pigment and fibrets in amounts which provide the necessary degree of opacity to cover effectively the underlying core stock when the decor sheet is impregnated and assembled into a laminate. Generally, the decor sheet contains about 10 to 60% of opacifying pigment, 1 to 20% fibrets, and 20 to 89% fiber (dry weight). The fibrets may be laden with $TiO_2$ containing 0 to 50% rutile $TiO_2$.

Some examples of decor sheet furnishes in accordance with the present invention and their properties are shown in Table 1 below.

TABLE 1

| | BASIS WT. | FURNISH % $TiO_2$ | % FIBRETS | % $TiO_2$ ON FIBRETS | % RETENTION | OPACITY RAW PAPER | WET TENSILE (g/in) | Ro BARRIER | Ro BLACK |
|---|---|---|---|---|---|---|---|---|---|
| 1 | 50 | 37 | 7.5 | — | 98.3 | 25.6 | 1505 | 82.4 | 73.3 |
| 2 | 60 | 37 | 7.5 | — | 98.4 | 26 | 1748 | 84.9 | 78.2 |
| 3 | 50 | 37 | 7.5 | 10 | 98.3 | 25.41 | 2088 | 84.4 | 74.2 |
| 4 | 60 | 37 | 7.5 | 10 | 98.7 | 25.5 | 1821 | 84.1 | 78.8 |
| 5 | 50 | 37 | 7.5 | 20 | 98.2 | 25.01 | 1092 | 83.2 | 74.3 |
| 6 | 60 | 37 | 7.5 | 20 | 98.6 | 25.19 | 1456 | 85.1 | 77.4 |
| 7 | 50 | 37 | 7.5 | 30 | 98.1 | 25.27 | 922 | 83.8 | 73.8 |
| 8 | 60 | 37 | 7.5 | 30 | 98.8 | 25.24 | 1044 | 84.8 | 77.1 |
| 9 | 50 | 42 | 7.5 | — | 98.2 | 25.96 | 1116 | 83.1 | 73.1 |
| 10 | 60 | 42 | 7.5 | — | 98.8 | 25.85 | 1505 | 84.3 | 77.1 |
| 11 | 50 | 42 | 7.5 | 10 | 98.5 | 29.39 | 1044 | 85 | 76.7 |
| 12 | 60 | 42 | 7.5 | 10 | 98.9 | 29.83 | 1262 | 85.4 | 79.8 |
| 13 | 50 | 42 | 7.5 | 20 | 98.1 | 26.82 | 971 | 84.3 | 76.6 |
| 14 | 60 | 42 | 7.5 | 20 | 99 | 26.95 | 1505 | 84.6 | 77.5 |
| 15 | 50 | 42 | 7.5 | 30 | 98.4 | 27.08 | 1335 | 84.8 | 74.4 |
| 16 | 60 | 42 | 7.5 | 30 | 98.7 | 27.17 | 1165 | 85 | 78.8 |

It is an object of the present invention to provide a decor sheet for use in decorative laminates, the decor sheet containing a sufficient amount of an opacifying pigment and fibrets to provide a desired level of opacity.

Due to the enhanced opacity which is attainable in the invention, it is often possible to lower the basis weight of the decor sheet. Accordingly, it is another object of the present invention to provide a decor sheet at lower basis weight and maintaining a desired level of opacity by including in the decor sheet fibrets and titanium dioxide or another opacifying pigment.

Still another object of the present invention is to provide a decorative laminate containing a decor sheet in accordance with the present invention.

Still another object of the present invention is to provide a decor sheet which has desired opacity at reduced ash by use of fibrets and $TiO_2$ pigments.

Still another object of the present invention is to provide a decorative paper which has resin savings and uniformity of saturation.

DETAILED DESCRIPTION

In accordance with the present invention, extender material "fibrets" and an opacifying pigment, e.g., titanium dioxide, are added to the furnish for the development of a decor sheet which is particularly useful in forming decorative laminates. By "desired level of opacity" is meant that the kraft core brown color is not seen through the the resin-saturated decor sheet.

The amount of fibrets and pigment which may be used will depend upon the basis weight of the paper, the nature of the opacifying pigment, and the degree of translucency desired. The basis weight of decor sheets in accordance with the invention may range from about 30 to 100 and preferably from about 40 to 60 lbs./3000 sq. ft. The preferred opacifying pigment is titanium dioxide.

Opacifying pigments which may be employed in the present invention include titanium dioxide, zinc oxide, carbon black, iron oxide, cobalt oxide, chromium oxide, clay, amorphous silica, etc. While this application makes reference to titanium dioxide in the preferred embodiments, those skilled in the art will appreciate that other opacifying pigments may be used in place of or in combination with titanium dioxide.

The fibers used in the decor sheet of the present invention are most typically cellulose fibers and preferably a bleached kraft pulp. The pulp may consist of hard woods or soft woods or a mixture of hard woods and soft woods. Higher alpha cellulose such as cotton may be added to enhance such characteristics as postformability. In addition to cellulose fibers, a wide variety of other fibers may be used alone or in combination with cellulose fibers. For example, the decor layer may be formed from cellulose fibers, synthetic fibers such as nylon, rayon, acrylic, olefinic, etc., or inorganic fibers such as asbestos and glass; or mixtures thereof.

Fibrets are a highly fibrillated form of cellulose acetate. The fibrets make for a high surface area material. These characteristics enable the fibrets to act as a binder or as a mechanical trap for small particles, and can improve coverability, reduce porosity, improve opacity and saturatability of the decor sheet. The fibrets used in the present invention generally have a fiber diameter of about 0.5 to 5 microns, a fiber length of about 20 to 200 microns and a surface area of 10 to 40 $m^2/g$.

In one embodiment of the invention the fibrets are laden with a pigment and, more particularly, titanium dioxide. The cellulose acetate fibrets laden with titanium dioxide are commercially available from Hoechst Celanese. The fibrets are available containing about 0 to 50% titanium dioxide based on cellulose acetate fibrets. For use in the invention fibrets laden with 5 to 25% titanium dioxide are preferred.

Additives conventionally used in decor sheets such as alum, alkali and the like may be added in conventional amounts to control end use characteristics such as postforming. Wet strength resins may be added for wet strength characteristics. A retention aid may also be added if desired.

The decor sheets are formed, dried and impregnated in an otherwise conventional manner. The sheets are preferably impregnated with commercially available melamine formaldehyde or polyester laminating resins and dried to a non-tacky but fusible B stage. Selection of the resin for impregnation of the decor will largely be governed by the intended end use of the finished laminate. Aminoplasts such as melaminealdehyde resins, acrylics such as polyacrylonitrile, polyester resins such as diallyl phthalate, phenolic resins, polyurethanes, and epoxy resins may be used.

The decor sheet of the present invention may be employed in combination with a number of unbleached kraft resinimpregnated core sheets in a conventional manner.

Laminates in accordance with the present invention may be provided with glossy, matted or satin finishes in a known manner. Furthermore, properties such as flame retardant characteristics, abrasion resistance can be introduced using technology which is readily available.

The present invention is further illustrated by the following nonlimiting examples.

COMPARATIVE EXAMPLE

A furnish containing 100 parts bleached kraft fibers, 57.0 parts light stable laminating grade rutile titanium dioxide, and a wet strength resin was used to prepare 60 lb. and 50 lb. basis weight decor sheets. Titanium dioxide was flocculated using conventional synthetic retention aids. The bleached kraft fibers used were a mixture of soft wood and hard wood fibers refined by conventional techniques. The sheets were formed on a fourdrinier pilot paper machine.

The sheets were saturated with a melamine formaldehyde thermosetting resin and the saturated sheets were cured to a B-stage by heating. Once the sheets were properly ordered, the sheets were pressed together in a laboratory laminating press at 325° F. and 1000 psi for 10 minutes and cooled under pressure for 5 minutes. The laminate thus obtained had the desired opacity.

Those skilled in the art will appreciate that in addition to melamine formaldehyde resins, any conventional laminating resin can be used in the present invention including phenolics, epoxies and polyester impregnating resins.

EXAMPLE 1

A furnish containing 100 parts bleached kraft fibers of the type described in Example 1, 37.0 parts light stable rutile titanium dioxide and 7.5 parts fibrets, and wet strength resin were used to prepare 60 lb. and 50 lb. basis weight decor sheets on a fourdrinier pilot paper machine, and a laminate formed as described in Example 1. Approximately 20% titanium dioxide was replaced with 7.5% fibrets.

EXAMPLE 2

A furnish containing 100 parts bleached kraft fibers of the type described in Example 1, 42 parts rutile titanium dioxide, 7.5 parts fibrets, and wet strength resin were used to prepare and form 60 lb. and 50 lb. basis weight decor sheets. Again, a laminate was formed as in Example 1. In this experiment, approximately 15% titanium dioxide was replaced with 7.5% fibrets.

EXAMPLES 3-6

Examples 1 and 2 were repeated using respectively fibrets laden with 10% (Examples 3 and 4) and 20% (Examples 5 and 6) titanium dioxide.

The following tables show the effect on opacity using fibrets and $TiO_2$ laden fibrets in the laminates.

TABLE 3

|  | B.W | % TiO$_2$ Replaced | % Fibrets* Used | Sheet Opacity | Laminate Opacity Over Barrier |
|---|---|---|---|---|---|
| Comparative | 50 | 0 | 0 | 98.1 | 84 |
| Example | 60 | 0 | 0 | 98.8 | 85 |
| Example 1 | 50 | 20 | 7.5 | 98.3 | 82.4 |
|  | 60 | 20 | 7.5 | 98.4 | 84.9 |
| Example 2 | 50 | 15 | 7.5 | 98.2 | 82.1 |
|  | 60 | 15 | 7.5 | 98.0 | 84.3 |

Note: Fibrets used are not laden with titanium dioxide.

TABLE 4

Fibrets Laden with 10% Rutile Titanium Dioxide.

|  | B.W | % TiO$_2$ Replaced | % Fibrets* Used | Sheet Opacity | Laminate Opacity Over Barrier |
|---|---|---|---|---|---|
| Comparative | 50 | 0 | 0 | 98.1 | 84 |
| Example | 60 | 0 | 0 | 98.8 | 85 |
| Example 3 | 50 | 20 | 7.5 | 98.3 | 84.4 |
|  | 60 | 20 | 7.5 | 98.7 | 84.1 |
| Example 4 | 50 | 15 | 7.5 | 98.5 | 85.0 |
|  | 60 | 15 | 7.5 | 98.9 | 85.4 |

TABLE 5

Fibrets Laden with 20% Rutile Titanium Dioxide

|  | B.W | % TiO$_2$ Replaced | % Fibrets* Used | Sheet Opacity | Laminate Opacity Over Barrier |
|---|---|---|---|---|---|
| Comparative | 50 | 0 | 0 | 98.1 | 84 |
| Example | 60 | 0 | 0 | 98.8 | 85 |
| Example 5 | 50 | 20 | 7.5 | 98.2 | 83.2 |
|  | 60 | 20 | 7.5 | 98.6 | 85.1 |
| Example 6 | 50 | 15 | 7.5 | 98.1 | 84.3 |

TABLE 5-continued

Fibrets Laden with 20% Rutile Titanium Dioxide

|  | B.W | % TiO$_2$ Replaced | % Fibrets* Used | Sheet Opacity | Laminate Opacity Over Barrier |
|---|---|---|---|---|---|
|  | 60 | 15 | 7.5 | 98.0 | 84.6 |

Having described the invention in detail and by reference to preferred embodiments thereof, it will be apparent that modifications and variations are possible without departing from the scope of the invention defined in the appended claims.

What is claimed is:

1. A decor sheet for use in a decorative laminate comprising:
   bleached cellulose fibers;
   about 10 to 60% titanium dioxide; and
   about 1 to 20% cellulose acetate fibrets; said sheet having a basis weight of 30 to 100 lbs/3000 sq. ft.

2. The sheet of claim 1 wherein said cellulose acetate fibrets are laden with up to 50% rutile titanium dioxide.

3. A decorative laminate comprising a plurality of consolidated resin impregnated fibrous sheets, at least one of said sheets being a decor sheet formed of bleached cellulose fibers, about 10 to 60% titanium dioxide and about 1 to 20% cellulose acetate fibrets, said decor sheet having a basis weight of about 30 to 100 lbs/3000 sq. ft.

4. The laminate of claim 3 wherein said cellulose acetate fibrets are laden with up to 50% rutile titanium dioxide.

5. The sheet of claim 2 wherein said fibrets are laden with up to 50% titanium dioxide based on the weight of the fibret.

6. The laminate of claim 4 wherein said fibrets are laden with up to 50% titanium dioxide based on the weight of the fibret.

7. The sheet of claim 1 wherein said sheet has a basis weight of approximately 40 to 60 lbs/3000 sq. ft.

8. The laminate of claim 3 wherein said decor sheet has a basis weight of approximately 40 to 60 lbs/3000 sq. ft.

* * * * *